United States Patent
Adams et al.

(10) Patent No.: US 8,852,327 B1
(45) Date of Patent: Oct. 7, 2014

(54) AIR DRYER CARTRIDGE WITH INTEGRATED CHECK VALVE

(71) Applicant: Haldex Brake Products Corporation, Kansas City, MO (US)

(72) Inventors: Andrew W. Adams, Lee's Summit, MO (US); David A. Prater, Kansas City, MO (US); Michael R. Jenkins, Kansas City, MO (US)

(73) Assignee: Haldex Brake Products Corporation, Kansas City, MO (US)

( * ) Notice: Subject to any disclaimer, the term of this patent is extended or adjusted under 35 U.S.C. 154(b) by 40 days.

(21) Appl. No.: 13/830,050

(22) Filed: Mar. 14, 2013

(51) Int. Cl.
  *B01D 53/02* (2006.01)
  *B01D 46/00* (2006.01)

(52) U.S. Cl.
  CPC ............. *B01D 46/0039* (2013.01); *Y10S 55/17* (2013.01)
  USPC .......................... 96/108; 55/417; 55/DIG. 17

(58) Field of Classification Search
  USPC ................................ 96/108; 55/417, DIG. 17
  See application file for complete search history.

(56) References Cited

U.S. PATENT DOCUMENTS

| | | |
|---|---|---|
| 3,680,283 A | 8/1972 | Jones, Jr. |
| 3,923,479 A | 12/1975 | Glass et al. |
| 4,487,617 A | 12/1984 | Dienes et al. |
| 4,581,047 A | 4/1986 | Larsson |
| 4,655,801 A | 4/1987 | Kojima et al. |
| 4,664,141 A | 5/1987 | Starr |
| 4,673,419 A | 6/1987 | Kojima |
| 4,713,094 A | 12/1987 | Yanagawa et al. |
| 4,755,196 A | 7/1988 | Frania et al. |
| 4,946,485 A | 8/1990 | Larsson |
| 5,286,282 A | 2/1994 | Goodell et al. |
| 5,286,283 A | 2/1994 | Goodell |
| 5,427,609 A | 6/1995 | Zoglman et al. |
| 5,662,727 A | 9/1997 | Castle et al. |
| 5,685,896 A | 11/1997 | Castle et al. |
| 5,715,621 A | 2/1998 | Mitsch |
| 5,851,269 A | 12/1998 | Strope |
| 5,899,435 A | 5/1999 | Mitsch et al. |
| 5,917,139 A | 6/1999 | Goodell et al. |
| 5,930,910 A | 8/1999 | Trapp et al. |
| 6,041,808 A | 3/2000 | Blanz |
| 6,089,262 A | 7/2000 | Hart |
| 6,216,489 B1 * | 4/2001 | Potnis et al. ................... 62/497 |
| 6,391,098 B1 | 5/2002 | Thomas |
| 6,484,413 B1 | 11/2002 | Larsson |
| 6,723,154 B2 | 4/2004 | Olsson et al. |
| 6,786,953 B2 | 9/2004 | Fornof et al. |
| 6,835,235 B2 | 12/2004 | Pilgram et al. |
| 6,878,194 B2 | 4/2005 | Hoffman et al. |
| 6,951,581 B2 | 10/2005 | Fornof et al. |
| 7,520,922 B2 | 4/2009 | Hoffman et al. |
| 7,544,234 B2 | 6/2009 | Fornof |
| 7,625,437 B2 | 12/2009 | Heer |

(Continued)

*Primary Examiner* — Christopher P Jones
(74) *Attorney, Agent, or Firm* — Stinson Leonard Street LLP (57) ABSTRACT

An air dryer cartridge having an outer shell, an inner shell positioned within the outer shell, and a check valve positioned at least partially between the inner and outer shells. The inner and outer shells each have an inlet and an outlet. The outer shell is preferably operable to removably engage an air dryer. The check valve is operable to regulate the rate of flow of fluid through the outlet of the inner shell. Preferably, the check valve also seals between portions of the inner and outer shells and/or is operable to sealingly engage an air dryer.

21 Claims, 5 Drawing Sheets

(56) References Cited

U.S. PATENT DOCUMENTS

| | | |
|---|---|---|
| 7,691,163 B2 | 4/2010 | Tao et al. |
| 8,246,728 B2 | 8/2012 | Hilberer |
| 2010/0212505 A1 | 8/2010 | Walker et al. |
| 2012/0118157 A1* | 5/2012 | Eidenschink et al. .......... 96/118 |
| 2013/0036912 A1* | 2/2013 | Clair et al. ..................... 96/118 |

* cited by examiner

AIR DRYER CARTRIDGE WITH INTEGRATED CHECK VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention is directed to an air dryer cartridge, and more specifically to an air dryer cartridge having an integrated check valve.

2. Description of Related Art

The pneumatic braking system of a commercial vehicle typically has an air compressor, a governor for controlling the operating cycle of the air compressor, an air dryer and a reservoir for holding pressurized air for delivery to the pneumatic components, such as the brakes. The air compressor operates successively in a loading (compressing) mode and an unloading (non-compressing) mode.

When the pressure in the air reservoir falls below a predetermined minimum pressure, typically about 100 psig, the governor causes the air compressor to operate in the loading mode to compress air for storage in the air reservoir. Before storing the air in the air reservoir, the compressed air from the air compressor passes through an air dryer which removes moisture and contaminants therefrom. When the air reservoir reaches the desired pressure, typically about 120 psig, the governor causes the air compressor to operate in the unloading mode and causes the purge valve in the air dryer to open to atmosphere.

One type of air dryer includes a removable cartridge that dries the compressed air as it flows through the cartridge during the loading mode. During the unloading mode, when the governor causes the purge valve in the air dryer to open the inlet of the cartridge to exhaust to atmosphere, the air flow direction is reversed and previously dried compressed air is sent through the cartridge to remove moisture and contaminants from the cartridge.

A check valve is commonly used to reduce the rate of flow of air through the cartridge during the unloading mode in order to more efficiently remove moisture and contaminants from the desiccant. The check valve is frequently positioned within a housing of the air dryer, but it may also be a part of the air dryer cartridge. One type of air dryer cartridge has outer and inner shells with a seal positioned between the two to direct air flow through a preferable passage within the cartridge. The seal is not integrated with a check valve. Typically, air dryer cartridges also have two separate gaskets or seals for sealing between a base of the cartridge and an air dryer. These seals are also not integrated with a check valve.

BRIEF SUMMARY OF THE INVENTION

The present invention is directed toward an air dryer cartridge having an outer shell, an inner shell positioned within the outer shell, and a check valve positioned at least partially between the inner and outer shells. The inner and outer shells each have an inlet and an outlet. The outer shell is preferably operable to removably engage an air dryer. The check valve is operable to regulate the rate of flow of fluid through the outlet of the inner shell. Incorporating the check valve into the air dryer cartridge permits an operator to replace the check valve by replacing the entire cartridge without accessing the interior of an air dryer on which the cartridge is installed.

Preferably, the check valve also seals between portions of the inner and outer shells and/or is operable to sealingly engage an air dryer. The check valve is preferably positioned to seal between the inner and outer shells and/or sealingly engage an air dryer on which the cartridge is installed to reduce complexity of the cartridge and the number of seals and serviceable items within the cartridge.

The outlet of the inner shell preferably includes a plurality of holes and the check valve preferably has a flap that is moveable between a low flow rate position, in which it blocks a majority of the holes, and a high flow rate position, in which fluid can flow through each of the holes. Preferably, the check valve has a first seal portion coupled with and extending from the flap that seals between portions of the inner and outer shells. The check valve also preferably has a second seal portion coupled with and extending from the first seal portion that is operable to sealingly engage an air dryer removably engaged by the outer shell. The inlets of the outer and inner shells may be spaced either radially inward or radially outward from the outlets of the outer and inner shells.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
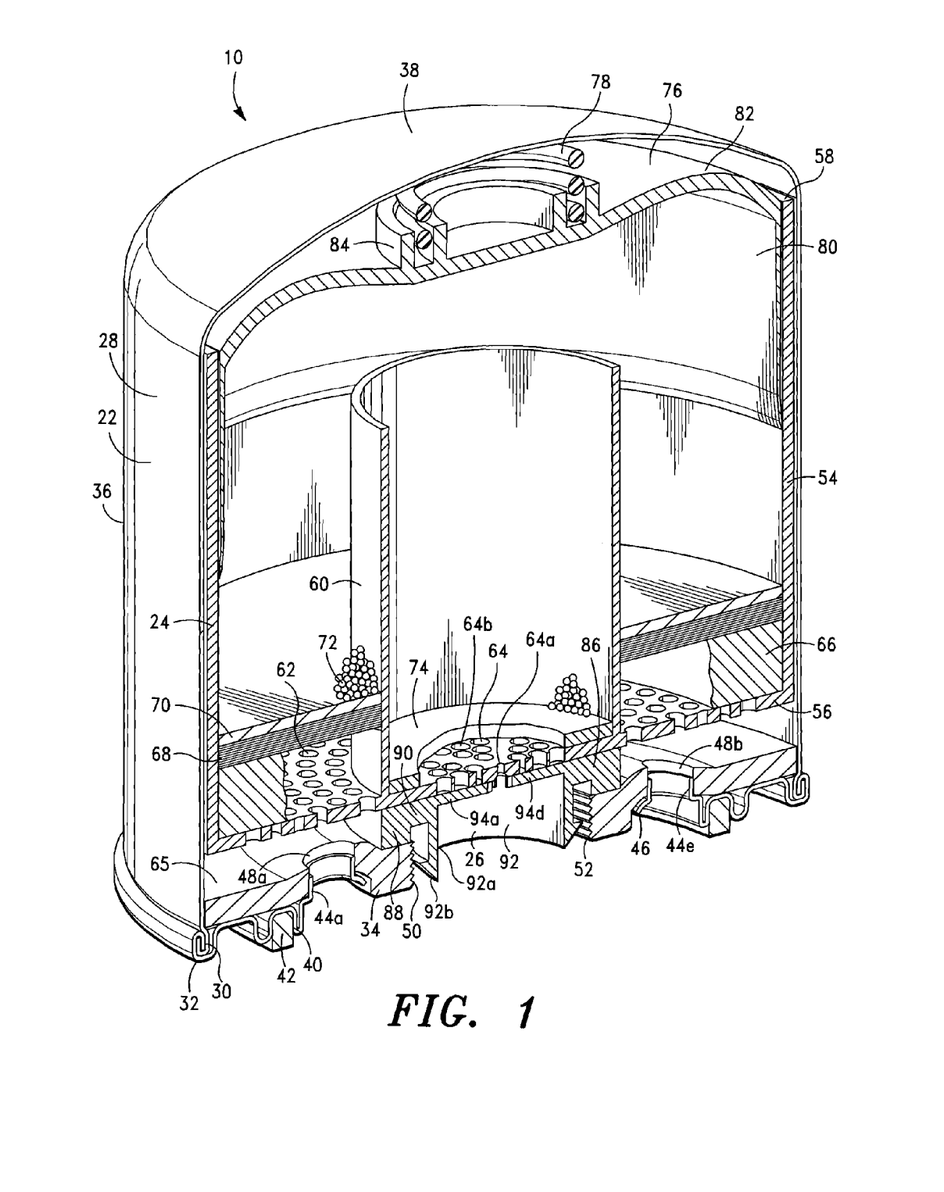
FIG. 1 is a cross-sectional view of an air dryer cartridge with an outside to inside air flow path during a loading mode.

An air dryer cartridge in accordance with one embodiment of the present invention is generally shown as 10 in FIG. 1. The cartridge 10 dries and cleans compressed air in an air supply system, such as the system shown in FIG. 7, before the air is routed to a supply reservoir 12, system reservoirs 13a and 13b and/or pneumatic components of the system, such as brake system 14. The cartridge 10 removably connects to an air dryer 16 that receives compressed air from air compressor 18 and routes the compressed air through the cartridge 10. Preferably, the cartridge 10 is used in the air system of a large motor vehicle such as a bus, truck, semi-tractor, or trailer, but it is within the scope of the invention for the cartridge 10 to be used in any type of air system. As discussed in more detail below, the cartridge 10 is operable to both dry and clean air in a loading mode and be regenerated in an unloading mode during which air flows from a purge reservoir 20 through the cartridge in the opposite direction as the flow of air during the loading mode to remove moisture and contaminants from the cartridge 10.

Figure 2:
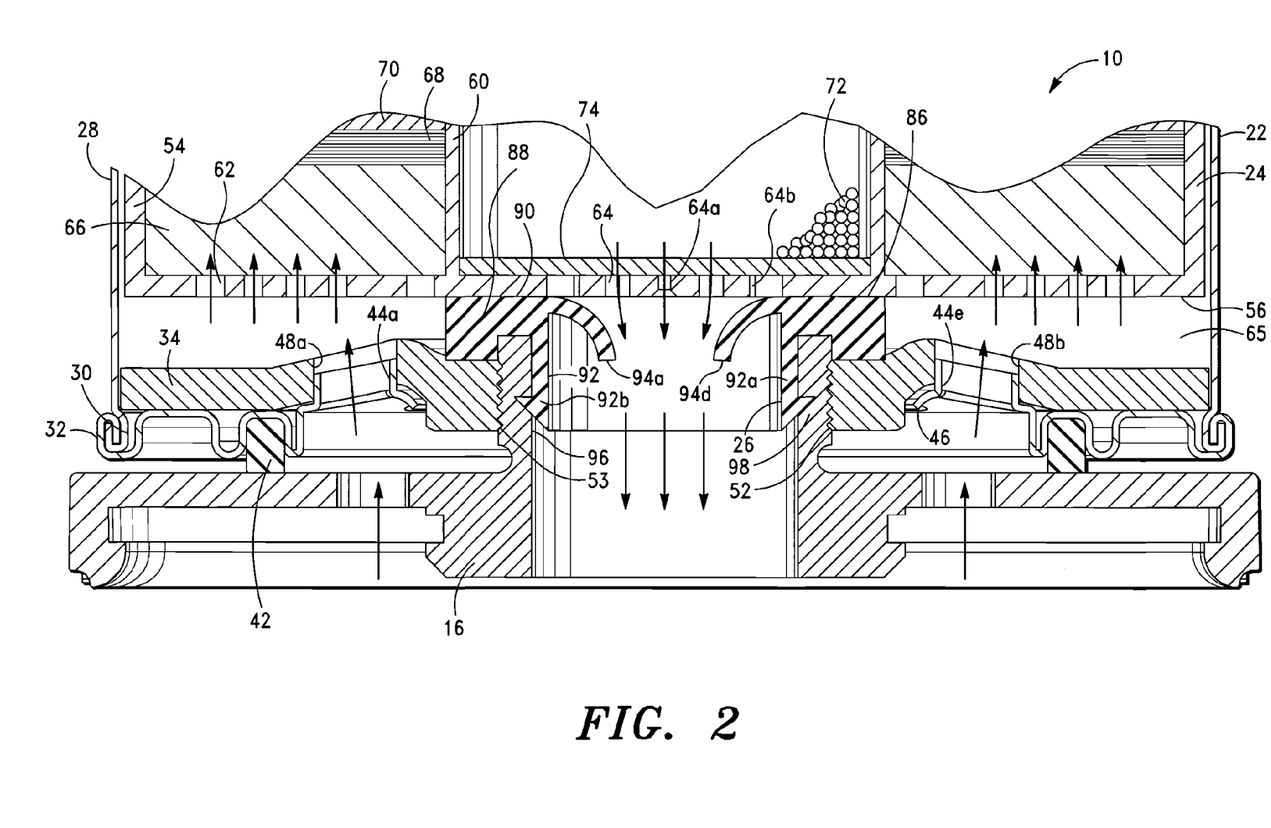
FIG. 2 is a partial cross-sectional view of the cartridge of FIG. 1 mounted to a dryer with arrows showing the air flow path during the loading mode.
Figure 3:
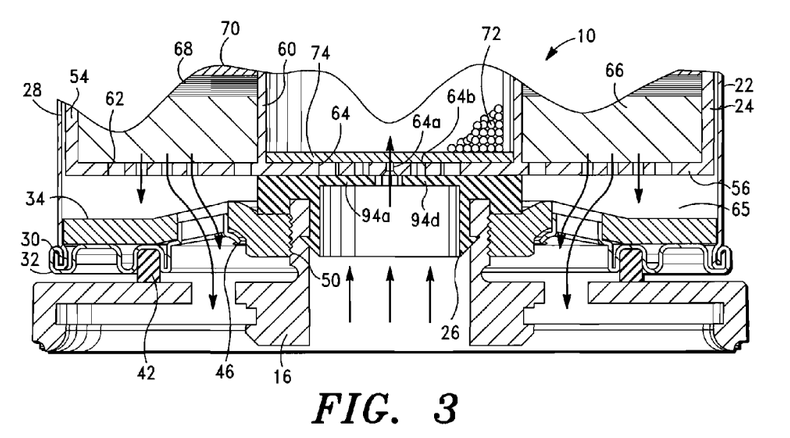
FIG. 3 is a partial cross-sectional view of the cartridge of FIG. 1 mounted to a dryer with arrows showing the air flow path during an unloading mode.

Referring to FIG. 1, the cartridge 10 includes an outer shell 22, an inner shell 24 positioned within outer shell 22, and a check valve 26 positioned partially between the outer shell 22 and inner shell 24. As described in more detail below, the check valve 26 seals between a portion of outer shell 22 and a portion of inner shell 24 and also sealingly engages air dryer 16 when the cartridge 10 is removably installed on the air dryer 16 as shown in FIGS. 2 and 3. The check valve 26 also regulates the rate of flow of fluid entering the cartridge 10 during the unloading mode shown in FIG. 3.

The outer shell 22 includes a cylindrical housing 28 having an open end 30 that is partially enclosed by a gasket retainer 32 and base plate 34. The housing 28 includes a side wall 36 integrally joined with a top wall 38. A lower end of the side wall 36 adjacent open end 30 is rolled with a peripheral edge of gasket retainer 32 to join the housing 28 and gasket retainer 32. A seal (not shown) may be positioned between the side wall 36 and gasket retainer 32 to prevent air flow between them. The gasket retainer 32 includes a groove 40 in its lower surface that receives a gasket 42, which seals between the gasket retainer 32 and air dryer 16, as shown in FIGS. 2 and 3. The gasket retainer 32 includes eight holes 44a-h (shown in FIG. 4) spaced equidistant from each other and a center of the cartridge 10 and surrounding a larger central hole 46 (shown in FIG. 1).

Base plate 34 is positioned on top of gasket retainer 32. The base plate 34 is disk shaped and is sized so that its peripheral edge closely fits within the inner surface of side wall 36. The base plate includes eight concentric holes, two of which are shown as 48a and 48b in FIG. 1, each aligned with the holes 44a-h of gasket retainer 32 and surrounding a larger central hole 50 that is smaller than and aligned with the central hole 46 of gasket retainer 32. The aligned holes 44a-h and 48a-b of gasket retainer 32 and base plate 34, respectively, in combination form an inlet of the outer shell 22. The aligned holes 46 and 50 of the gasket retainer 32 and base plate 34, respectively, form an outlet of the outer shell 22. Base plate 34 has a cylindrical, threaded surface 52 that surrounds opening 50 and engages a threaded surface 53 (FIG. 2) on air dryer 16 when the cartridge 10 is installed on the air dryer 16 as shown in FIGS. 2 and 3.

Inner shell 24 includes a cylindrical side wall 54 that is joined with an integral bottom wall 56 at one end and has an open end 58 opposite bottom wall 56. A cylindrical inner wall 60 is integral with and extends upward from bottom wall 56. Inner wall 60 is concentric with and has a smaller diameter than side wall 54. Bottom wall 56 includes a plurality of holes 62 positioned between the side wall 54 and inner wall 60 that in combination form an inlet of the inner shell 24. Bottom wall 56 also includes a plurality of holes 64 surrounded by the inner wall 60 that in combination form an outlet of the inner shell 24. The holes 64 include a central hole 64a and a plurality of holes 64b spaced radially outward from the central hole 64a. The inlets of outer shell 22 and inner shell 24 are spaced radially outward from the outlets of outer shell 22 and inner shell 24. Bottom wall 56 is spaced a distance from base plate 34 to create a ring-shaped chamber 65 between them.

A ring-shaped pre-filter 66 is supported by bottom wall 56 and is positioned between side wall 54 and inner wall 60. Although pre-filter 66 occupies the entire space between bottom wall 56 and the coalescing filter 68 described below, only a portion of pre-filter 66 is shown in FIG. 1 so that holes 62 are visible. Pre-filter 66 filters relatively large particles of contaminants from the air passing through it. A second ring-shaped coalescing filter(s) 68 is supported by filter 66 and is positioned between side wall 54 and inner wall 60. Coalescing filter 68 is designed to collect and remove oil aerosols from the compressed air. A third ring-shaped filter pad 70 is supported by filter 68 and is positioned between side wall 54 and inner wall 60. Filter pad 70 also removes contaminants from the air passing through it. Desiccant beads 72 fill the inner shell 24 between side wall 54 and inner wall 60 and within inner wall 60. Only a small number of desiccant beads 72 are shown in the drawings for clarity. The desiccant beads 72 absorb moisture from air that enters the inner shell 24 through holes 62 as is well known in the art. Filters 66, 68, and 70 prevent desiccant beads 72 from exiting inner shell 24 through holes 62. Another disk-shaped fine filter 74 is supported by bottom wall 56 and surrounded by inner wall 60. Although fine filter 74 covers all of holes 64, only a portion of fine filter 74 is shown in FIG. 1 so that holes 64 are visible. Fine filter 74 removes contaminants from air passing through it and prevents fine particles (dust) from exiting inner shell 24 through holes 64.

A load plate 76 and spring 78 are positioned between the desiccant beads 72 and top wall 38 of housing 28 to reduce gaps between the desiccant beads 72 and improve the performance of the beads 72. The load plate 76 includes a cylindrical side wall 80 that is slidably received by the side wall 54 of inner shell 24 and a top wall 82 integral with side wall 80 and spaced a distance from top wall 38 of housing 28. A spring retainer 84 is integral with and extends upward from top wall 82 toward the top wall 38 of housing 28. The spring retainer 84 includes concentric circular walls spaced a distance to define a groove for receiving a portion of spring 78 therebetween. Spring 78 is a coil spring positioned between the top wall 38 of housing 28 and top wall 82 of load plate 76 that forces load plate 76 downward to exert pressure on desiccant beads 72.

Figure 4:
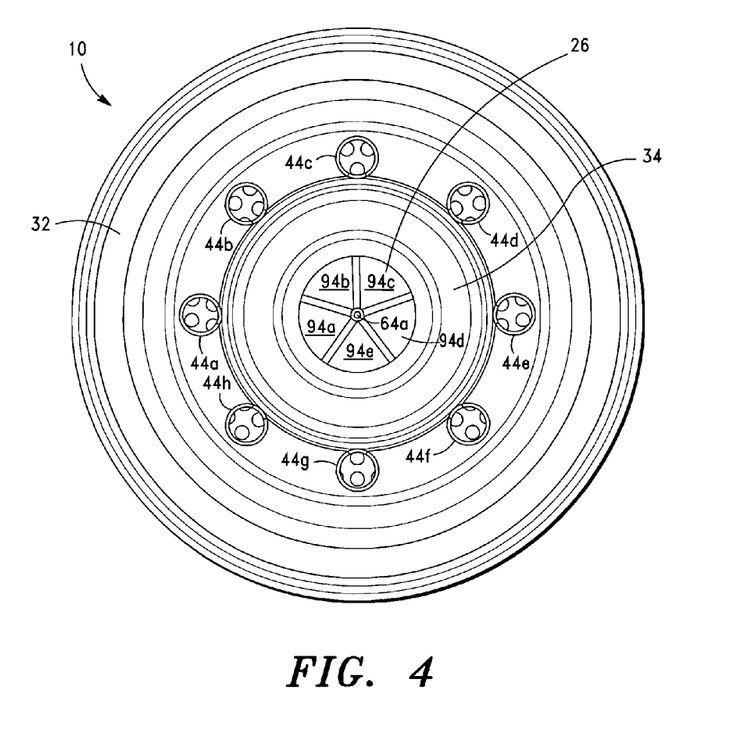
FIG. 4 is a bottom plan view of the cartridge of FIG. 1.

Check valve 26 includes a generally circular base 86 with a periphery forming a first seal portion 88 that seals between the base plate 34 of outer shell 22 and bottom wall 56 of inner shell 24. The base 86 includes a middle portion 90 integral with and extending radially inward from first seal portion 88. The middle portion 90 is slightly thinner than the first seal portion 88 to create a groove between the first seal portion 88 and a second seal portion 92 that is integral with and extends downward from middle portion 90. Five flaps 94a-e (shown in FIG. 4) are integral with and extend radially inward from the middle portion 90. While five flaps are shown in FIG. 4, it is within the scope of the invention for the check valve 26 to have any number of flaps. The second seal portion 92 includes a cylindrical section 92a extending generally perpendicular downward from the flaps 94a-e and a tapered end 92b with a triangular cross-section extending downward from the cylindrical section 92a. The tapered end 92b extends outward from the cylindrical section 92a and is operable to fit tightly against an inner cylindrical surface 96 of dryer 16, as shown in FIG. 2, for sealingly engaging dryer 16 and preventing air from flowing between the dryer 16 and second seal portion 92. The second seal portion 92 is generally concentric with and spaced apart from the cylindrical, threaded surface 52 of base plate 34. A cylindrical protrusion 98 of dryer 16 that defines inner surface 96 and contains threads 53 on its outer surface is positioned between the cylindrical, threaded surface 52 of base plate 34 and second seal portion 92 when cartridge 10 is installed on dryer 16. The protrusion 98 also abuts the first seal portion 88 and middle portion 90 and fits within the groove between the first seal portion 88 and second seal portion 92.

The flaps 94a-e of check valve 26 are operable to regulate the rate of flow of fluid through the holes 64 comprising the outlet of the inner shell 24. Referring to FIG. 2, when air enters the cartridge 10 in a loading mode through holes 44a-e of outer shell 22 and exits through holes 64 of inner shell 24, the air causes the flaps 94a-e to flex away from the bottom wall 56 of inner shell 24. When the flaps 94a-e are in this flexed, high flow rate position, the flaps 94a-e do not cover holes 64 so that air is operable to flow through the holes 64 and out of the cartridge 10 at a relatively high flow rate. A relatively high flow rate is desirable in the loading mode so that the air compressor 18 (FIG. 7) can quickly pressurize the air system. Referring to FIG. 3, when air enters the cartridge 10 in an unloading mode through the outlet of the outer shell 22 defined by holes 46 and 50, the flaps 94a-e are pressed against the bottom wall 56 of inner shell 24. When the flaps 94a-e are in this low flow rate position, the flaps 94a-e cover holes 64b leaving hole 64a as the only hole 64 through which air can flow into the inner shell 24. Because air can only flow through hole 64a when the flaps 94a-e are in this position, air flows through the cartridge 10 at a lower flow rate in the unloading mode than when in the loading mode. A lower flow rate is desirable in the unloading mode to maximize the removal of moisture and contaminants from the desiccant beads 72.

Figure 5:
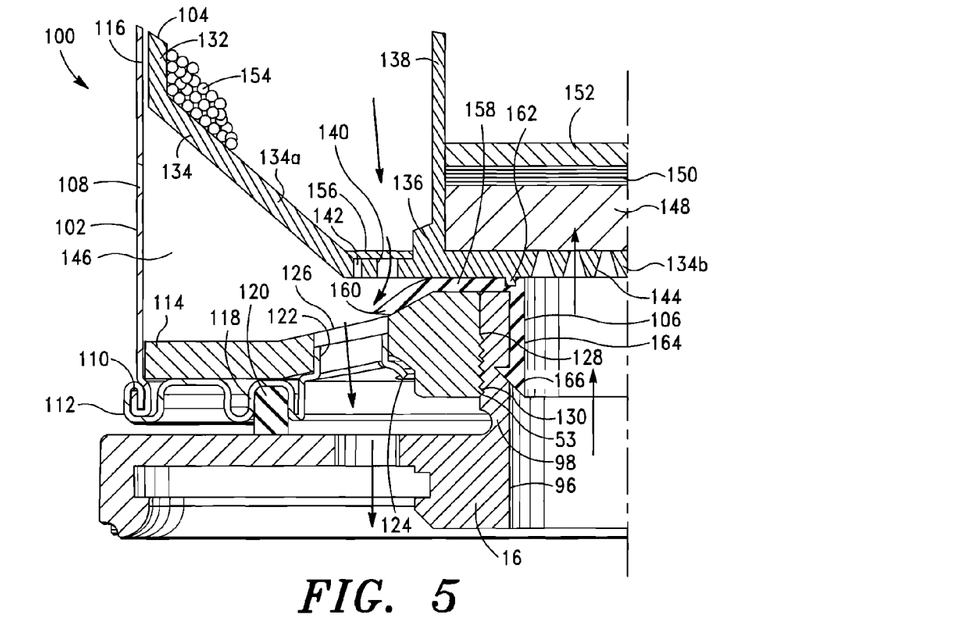
FIG. 5 is a partial cross-sectional view of an alternative embodiment of air dryer cartridge mounted to a dryer with arrows showing an inside to outside air flow path during a loading mode.
Figure 6:
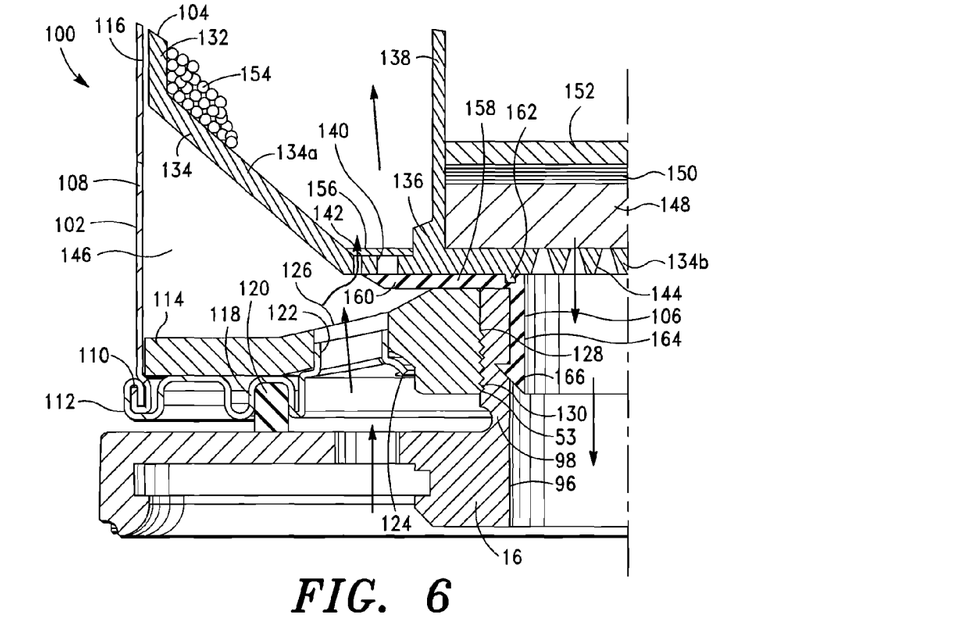
FIG. 6 is a partial cross-sectional view of the cartridge of FIG. 5 mounted to a dryer with arrows showing an air flow path during an unloading mode.

Referring now to FIGS. 5 and 6, a second embodiment of air dryer cartridge in accordance with the present invention is shown generally as 100. Cartridge 100 may be substituted for the cartridge 10 shown in FIG. 7 to dry and clean compressed air in the air supply system. Like cartridge 10, cartridge 100 is operable to both dry and clean air in a loading mode and be recharged in an unloading mode during which air flows from a purge reservoir 20 through the cartridge in the opposite direction as the flow of air during the loading mode to remove moisture and contaminants from the cartridge 100.

Referring to FIGS. 5 and 6, the cartridge 100 includes an outer shell 102, an inner shell 104 positioned within outer shell 102, and a check valve 106 positioned partially between the outer shell 102 and inner shell 104. As described in more detail below, the check valve 106 seals between a portion of outer shell 102 and a portion of inner shell 104 and also sealingly engages air dryer 16 when the cartridge 100 is removably installed on the air dryer 16 as shown in FIGS. 5 and 6. The check valve 106 also regulates the rate of flow of fluid entering the cartridge 100 during the unloading mode shown in FIG. 6.

The outer shell 102 includes a cylindrical housing 108 having an open end 110 that is partially enclosed by a gasket retainer 112 and base plate 114. The housing 108 includes a side wall 116 integrally joined with a top wall (not shown) in a similar manner as the housing 28 shown in FIG. 1. A lower end of the side wall 116 adjacent open end 110 is rolled with a peripheral edge of gasket retainer 112 to join the housing 108 and gasket retainer 112. A seal (not shown) may be positioned between the side wall 116 and gasket retainer 112 to prevent air flow between them. The gasket retainer 112 includes a groove 118 in its lower surface that receives a gasket 120, which seals between the gasket retainer 112 and air dryer 16, as shown in FIGS. 5 and 6. The gasket retainer 112 includes eight holes, one of which is shown as 122, spaced equidistant from each other and a center of the cartridge 100 and surrounding a larger central hole 124. The holes 122 are similar to the holes 44a-h of cartridge 10 shown in FIG. 4.

Base plate 114 is positioned on top of gasket retainer 112. The base plate 114 is disk shaped and is sized so that its peripheral edge closely fits within the inner surface of side wall 116. The base plate 114 includes eight concentric holes, one of which is shown as 126, each aligned with the holes 122 of gasket retainer 112 and surrounding a larger central hole 128 that is smaller than and aligned with the central hole 124 of gasket retainer 112. The aligned holes 122 and 126 of gasket retainer 112 and base plate 114, respectively, in combination form an outlet of the outer shell 102. The aligned holes 124 and 128 of the gasket retainer 112 and base plate 114, respectively, form an inlet of the outer shell 102. Base plate 114 has a cylindrical, threaded surface 130 that surrounds opening 128 and engages a threaded surface 53 on air dryer 16 when the cartridge 100 is installed on the air dryer 16 as shown in FIGS. 5 and 6.

Inner shell 104 includes a cylindrical side wall 132 that is joined with an integral bottom wall 134 at one end and has an open end (not shown) opposite bottom wall 134 similar to inner shell 24 shown in FIG. 1. Bottom wall 134 includes a peripheral angled section 134a integral with and extending downward from side wall 132 and a central horizontal section 134b integral with angled section 134a. A step 136 including substantially vertical and horizontal surfaces extends upward from bottom wall section 134b. A cylindrical inner wall 138 is integral with and extends upward from step 136. Inner wall 138 is concentric with and has a smaller diameter than side wall 132. Central section 134b of bottom wall 134 includes a plurality of holes 140 and 142 positioned between the side wall 132 and inner wall 138 that in combination form an outlet of the inner shell 104. Holes 140 have a larger diameter than holes 142. Preferably, there are four holes 142 evenly spaced from each other and having a diameter of approximately 0.035 inches. Preferably, there are a plurality of holes 140 for allowing air to flow at a relatively high flow rate out of the inner shell 104. Central section 134b also includes a plurality of holes 144 surrounded by the inner wall 138 that in combination form an inlet of the inner shell 104. The outlets of outer shell 102 and inner shell 104 are spaced radially outward from the inlets of outer shell 102 and inner shell 104. Bottom wall 134 is spaced a distance from base plate 114 to create a chamber 146 between them.

A circular pre-filter 148 is supported by bottom wall 134 and is surrounded by inner wall 138. Pre-filter 148 preferably performs the same functions as the pre-filter 66 shown in FIG. 1. A second circular coalescing filter 150 is supported by filter 148 and is surrounded by inner wall 138. Coalescing filter 150 preferably performs the same functions as the coalescing filter 68 shown in FIG. 1. A third circular filter pad 152 is supported by filter 150 and is surrounded by inner wall 138. Filter pad 152 preferably performs the same functions as the filter pad 70 shown in FIG. 1. Desiccant beads 154 fill the inner shell 104 between side wall 132 and inner wall 138 and within inner wall 138. Only a small number of desiccant beads 154 are shown in the drawings for clarity. The desiccant beads 154 remove moisture and contaminants from air that enters the inner shell 104 through holes 144 as is well known in the art. Filters 148, 150, and 152 prevent desiccant beads 154 from exiting inner shell 104 through holes 144. Another ring-shaped fine filter 156 is supported by bottom wall 134 above holes 140 and 142. Fine filter 156 preferably performs the same functions as the fine filter 74 shown in FIG. 1 and prevents desiccant beads 154 from exiting inner shell 104 through holes 140.

The cartridge 100 preferably has a load plate (not shown) and spring (not shown) that are similar to the load plate 76 and spring 78 of cartridge 10 described above and shown in FIG. 1 to reduce gaps between the desiccant beads 154 and improve the performance of the beads 154.

Check valve 106 includes a generally circular base 158 that forms a first seal portion sealing between the base plate 114 of outer shell 102 and bottom wall 134 of inner shell 104. The peripheral edge of the base 158 forms a flap 160 extending radially outward from the first seal portion. A groove 162 in the base 158 receives a corresponding protrusion of bottom wall 134 for aligning the check valve 106. A second seal portion 164 is integral with and extends downward from base 158. The second seal portion 164 includes a cylindrical section extending generally perpendicular downward from the base 158 and a tapered end 166 with a triangular cross-section extending downward from the cylindrical section. The tapered end 166 extends outward from the cylindrical section and is operable to fit tightly against an inner cylindrical surface 96 of dryer 16, as shown in FIG. 5, for sealingly engaging dryer 16 and preventing air from flowing between the dryer 16 and second seal portion 164. The second seal portion 164 is generally concentric with and spaced apart from the cylindrical, threaded surface 130 of base plate 114. Cylindrical protrusion 98 of dryer 16 that defines inner surface 96 and contains threads 53 on its outer surface is positioned between the cylindrical, threaded surface 130 of base plate 114 and second seal portion 164 when cartridge 100 is installed on dryer 16. The protrusion 98 also abuts the base 158.

The flap 160 of check valve 106 is operable to regulate the rate of flow of fluid through the holes 140 comprising a portion of the outlet of the inner shell 104. Referring to FIG. 5, when air enters the cartridge 100 in a loading mode through hole 128 of outer shell 102 and holes 144 of inner shell 104 and exits through holes 140 and 142 of inner shell 104, the air causes the flap 160 to flex away from the bottom wall 134 of inner shell 104. When the flap 160 is in this flexed, high flow rate position, the flap 160 is positioned away from the holes 140 so that air is operable to flow through the holes 140 and out of the cartridge 100 at a relatively high flow rate. Referring to FIG. 6, when air enters the cartridge 100 in an unloading mode through the outlet of the outer shell 102 defined by holes 122 and 126, the air presses flap 160 into a low flow rate position against bottom wall 134 where it covers holes 140. Thus, in the unloading mode air is blocked from flowing through holes 140 and can only flow into inner shell 104 through holes 142. Because there are only four holes 142 having a relatively small diameter, the rate of flow of air into inner shell 104 during the unloading mode is less than the rate of flow of air through the cartridge 100 during the loading mode.

Figure 7:
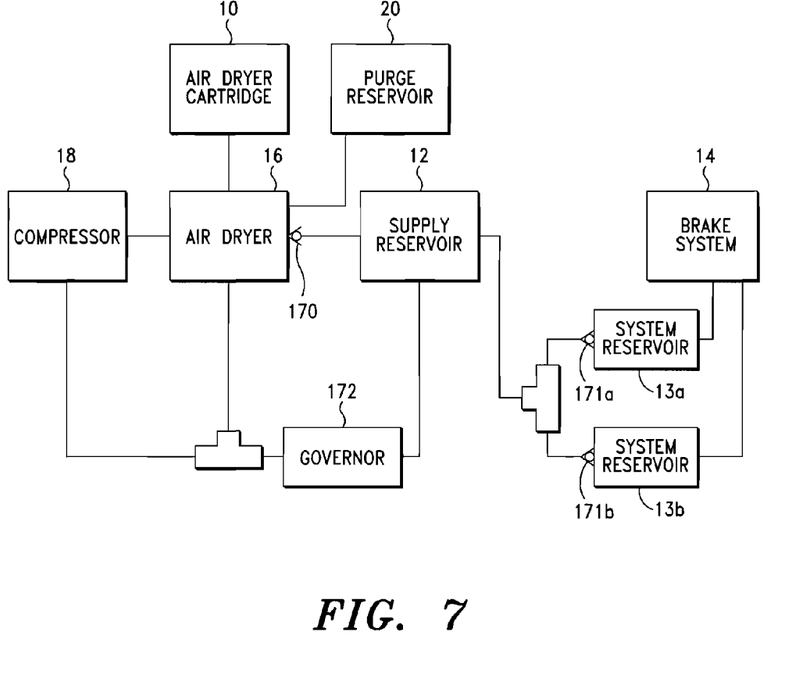
FIG. 7 is a flow chart of an air dryer system for which the cartridge of FIG. 1 or FIG. 5 may be used.

In operation, referring to FIG. 7, when the air system is operating in a loading mode, air compressor 18 compresses air that flows into air dryer 16. The air passes from air dryer 16 into either air dryer cartridge 10 or air dryer cartridge 100 (shown in FIG. 5) to dry and clean the air as described above. The air flows out of air dryer cartridge 10 back into air dryer 16. The air dryer 16 has two outlets, one for supplying air to purge reservoir 20 and another for supplying air to supply reservoir 12. The air dryer 16 also has an outlet one-way check valve 170 that the air passes through before entering supply reservoir 12. Supply reservoir 12 supplies air to system reservoirs 13a and 13b, which store the pressurized air until it is needed to operate components of brake system 14.

Each of the system reservoirs 13a and 13b has an inlet one-way check valve 171a and 171b, respectively, that prevents air in the system reservoirs 13a and 13b from flowing back into the supply reservoir 12. During the loading mode, the air pressure in purge reservoir 20 and supply reservoir 12 is approximately equal. Governor 172 is fluidly coupled with supply reservoir 12 to sense when the air pressure reaches a cut off level. When the air pressure within supply reservoir 12 reaches a cut off level, governor 172 operates an unloader(s) (not shown) within the air compressor 18 which shuts off air compressor 18. The governor 172 also opens a purge valve (not shown) of air dryer 16 which causes air within the air dryer 16 to exhaust from the air dryer 16 to the atmosphere. When air compressor 18 shuts off, the air system is in an unloading mode for removing moisture and contaminants from air dryer cartridge 10. In the unloading mode, air flows from the purge reservoir 20 through air dryer 16 and air dryer cartridge 10 in the reverse direction as the air flow during the loading mode. The air removes moisture and contaminants from the air dryer cartridge 10 and exhausts from the air dryer 16 to the atmosphere. During the unloading mode, check valve 170 prevents air from flowing out of supply reservoir 12 back into air dryer 16. In the unloading mode, the air flows in reverse through air dryer cartridge 10 at a lower flow rate than in the loading mode, as described above. It is within the scope of the invention for cartridges 10 and 100 to be used in different types of systems then the one shown in FIG. 7 and described herein. For example, the purge reservoir 20 may be incorporated within the air dryer 16, and the purge reservoir 20 may be connected in series to the supply reservoir 12 instead of being connected in parallel to the supply reservoir 12 as shown in FIG. 7. Alternatively, purge reservoir 20, check valve 170, and check valve 171b may be omitted so that air from system reservoir 13b flows in reverse through the air dryer cartridge 10 during the unloading mode. In this embodiment of air system, the system reservoir 13b has a pressure controlled check valve (not shown) and the air dryer 16 includes a valve (not shown) at its outlet that regulates the amount of air from system reservoir 13b that flows in reverse through the air dryer cartridge 10.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. An air dryer cartridge, comprising:
   an outer shell comprising an inlet and an outlet;
   an inner shell positioned within said outer shell and comprising an inlet and an outlet; and
   a check valve positioned at least partially between said outer shell and said inner shell and sealing between a portion of said outer shell and a portion of said inner shell, wherein said check valve is operable to regulate the rate of flow of fluid through said outlet of said inner shell.

2. The air dryer cartridge of claim 1, wherein said outlet of said inner shell comprises a plurality of holes, wherein said check valve comprises at least one flap moveable between a low flow rate position, in which said flap restricts the rate of flow of fluid through at least a portion of said holes, and a high flow rate position.

3. The air dryer cartridge of claim 2, wherein said check valve comprises a plurality of flaps moveable between said low flow rate position, in which said flaps block fluid from flowing through a majority of said holes, and said high flow rate position, in which fluid can flow through each of said holes.

4. The air dryer cartridge of claim 3, wherein said check valve comprises a first seal portion coupled with and extending radially outward from said flaps, wherein said first seal portion seals between a portion of said outer shell and a portion of said inner shell.

5. The air dryer cartridge of claim 4, wherein said outer shell is operable to removably engage an air dryer, wherein said check valve comprises a second seal portion coupled with and extending from said first seal portion, wherein said second seal portion is operable to sealingly engage said air dryer.

6. The air dryer cartridge of claim 5, wherein said inlet of said outer shell and said inlet of said inner shell are spaced radially outward from said outlet of said outer shell and said outlet of said inner shell.

7. The air dryer cartridge of claim 2, wherein said flap blocks fluid from flowing through a majority of said holes when in said low flow rate position, and wherein fluid can flow through each of said holes when said flap is in said high flow rate position.

8. The air dryer cartridge of claim 2, wherein said check valve comprises a first seal portion coupled with and extending radially inward from said flap, wherein said first seal portion seals between a portion of said outer shell and a portion of said inner shell.

9. The air dryer cartridge of claim 8, wherein said outer shell is operable to removably engage an air dryer, wherein said check valve comprises a second seal portion coupled with said first seal portion and extending from said first seal portion, wherein said second seal portion is operable to sealingly engage said air dryer.

10. The air dryer cartridge of claim 9, wherein said inlet of said outer shell and said inlet of said inner shell are spaced radially inward from said outlet of said outer shell and said outlet of said inner shell.

11. The air dryer cartridge of claim 1, further comprising desiccant positioned within said inner shell.

12. An air dryer cartridge, comprising:
an outer shell comprising an inlet and an outlet, wherein said outer shell comprises an air dryer engagement surface that is operable to removably engage an air dryer;
an inner shell positioned within said outer shell and comprising an inlet and an outlet; and
a check valve positioned at least partially between said outer shell and said inner shell, wherein said check valve is operable to regulate the rate of flow of fluid through said outlet of said inner shell, and wherein said check valve comprises a seal portion that is operable to sealingly engage said air dryer, wherein said air dryer engagement surface is spaced from said seal portion to define a gap that is configured to receive a portion of said air dryer.

13. The air dryer cartridge of claim 12, wherein said outlet of said inner shell comprises a plurality of holes, wherein said check valve comprises at least one flap moveable between a low flow rate position, in which said flap restricts the rate of flow of fluid through at least a portion of said holes, and a high flow rate position.

14. The air dryer cartridge of claim 13, wherein said seal portion is coupled with and extends from said flap.

15. The air dryer cartridge of claim 14, wherein said air dryer engagement surface is cylindrical, and wherein said seal portion is generally concentric with said air dryer engagement surface.

16. The air dryer cartridge of claim 15, wherein said seal portion comprises a cylindrical section extending generally perpendicular from said flap, and a tapered end extending from said cylindrical section.

17. An air dryer cartridge, comprising:
an outer shell comprising an inlet and an outlet, wherein said outer shell is operable to removably engage an air dryer;
an inner shell positioned within said outer shell and comprising an inlet and an outlet; and
a check valve positioned at least partially between said outer shell and said inner shell and sealing between a portion of said outer shell and a portion of said inner shell, wherein said check valve is operable to regulate the rate of flow of fluid through said outlet of said inner shell, and wherein said check valve is operable to sealingly engage said air dryer.

18. The air dryer cartridge of claim 17, wherein said outlet of said inner shell comprises a plurality of holes, wherein said check valve comprises at least one flap moveable between a low flow rate position, in which said flap restricts the rate of flow of fluid through at least a portion of said holes, and a high flow rate position.

19. The air dryer cartridge of claim 18, wherein said check valve comprises a first seal portion coupled with and extending from said flap, wherein said first seal portion seals between a portion of said outer shell and a portion of said inner shell.

20. The air dryer cartridge of claim 19, wherein said check valve comprises a second seal portion coupled with and extending from said first seal portion, wherein said second seal portion is operable to sealingly engage said air dryer.

21. An air dryer assembly comprising:
an air dryer; and
an air dryer cartridge comprising:
an outer shell comprising an inlet and an outlet, wherein said outer shell is operable to removably engage said air dryer;
an inner shell positioned within said outer shell and comprising an inlet and an outlet; and
a check valve positioned at least partially between said outer shell and said inner shell, wherein said check valve is operable to regulate the rate of flow of fluid through said outlet of said inner shell, and wherein said check valve sealingly engages said air dryer when said outer shell engages said air dryer.

* * * * *